United States Patent [19]

Stewart

[11] 4,134,706

[45] Jan. 16, 1979

[54] AXIALLY SUPPORTED BORING TOOL

[76] Inventor: Arthur H. Stewart, 4487 Hillsborough Dr., Castro Valley, Calif. 94546

[21] Appl. No.: 811,821

[22] Filed: Jun. 27, 1977

Related U.S. Application Data

[62] Division of Ser. No. 725,002, Sep. 20, 1976, Pat. No. 4,090,807.

[51] Int. Cl.$^2$ .................... B23B 51/00

[52] U.S. Cl. .................... 408/213; 145/116 R

[58] Field of Search .................... 145/116 R; 408/213, 408/214, 199, 229

[56] References Cited

U.S. PATENT DOCUMENTS 1,140,988 5/1915 Kunitz .................... 145/116 A 3,945,753 3/1976 Byers et al. .................... 145/116 R

FOREIGN PATENT DOCUMENTS 25225 10/1951 Finland .................... 145/116 R 194542 3/1923 United Kingdom .................... 145/116 R

*Primary Examiner*—Gil Weidenfeld

[57] ABSTRACT

The invention relates to a bit for boring a hole in wood or the like, the bit having a surrounding skirt to give the bit axial stability during a boring operation, and, a leading spur to produce a circumambient groove prior to and deeper than the cutting blades to prevent material being cut from the bore, from splintering beyond the perimeter of the bore and thus produce a smooth wall surface.

Provision is made for assuring cooler operation, particularly at the higher speeds of operation.

5 Claims, 5 Drawing Figures

AXIALLY SUPPORTED BORING TOOL

This is a division of application Ser. No. 725,002, filed Sept. 20, 1976 now U.S. Pat. No. 4,090,807.

The invention relates to structure and method of manufacture of certain drill bits having new features over those disclosed in a patent issued to me Apr. 28, 1959, U.S. Pat. No. 2,883,888, titled "BORING TOOL AND METHOD FOR MAKING SAME."

Currently when boring a hole with a drill bit that is larger than the shaft to which it is attached, an inherent problem exists, namely that of maintaining axial alignment of the bit within the bore, especially during a hand drilling operation using portable power. Generally, the area of radial support of the bit is only in line with the blades, leaving the bit freedom to tilt in any direction from this line. This problem becomes especially acute when boring overlapping holes or when boring on an angle.

The present invention, not only solves the problem to a high degree, but incorporates additional features toward improving the operations of such drill bits.

Among the objects of my invention are:

(1) To provide a novel and improved wood boring bit;

(2) To provide a novel and improved wood boring bit or the like which provides itself with full 360° support during a boring operation;

(3) To provide a novel and improved wood boring bit or the like that will produce a clean splinter free hole;

(4) To provide a novel and improved wood boring bit or the like that is safer to use when drilling angular or intersecting holes;

(5) To provide a novel and improved method of fabricating an axially supported wood boring bit.

(6) To provide a cooler running bit, particularly at the higher speeds of drilling;

(7) To provide a drill bit which is simple but ruggedly constructed to well withstand the forces and abuse to which such bits are exposed in use.

Additonal objects of the invention will be brought out in the following description of the same, taken in conjunction with the accompanying drawings wherein.

Figure 1:
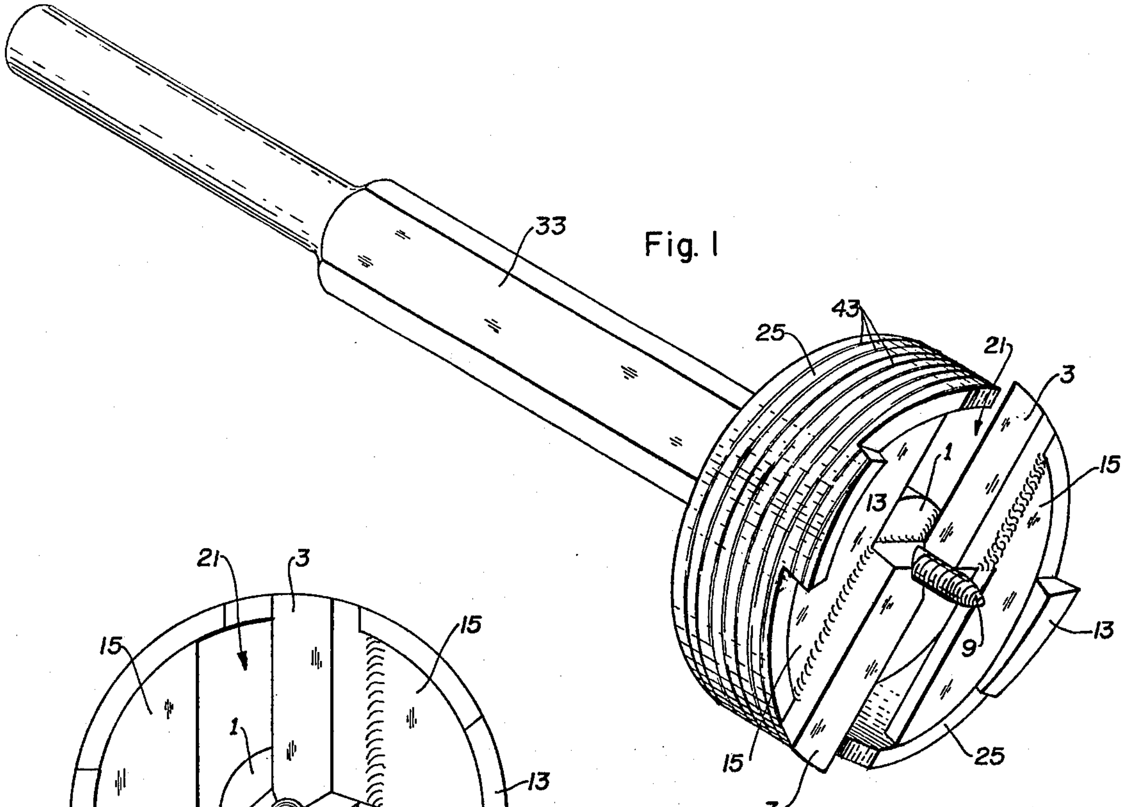
FIG. 1 is a three dimensional view of one embodiment of a bit preferably for manual use, and depicting features of the invention.
Figure 2:
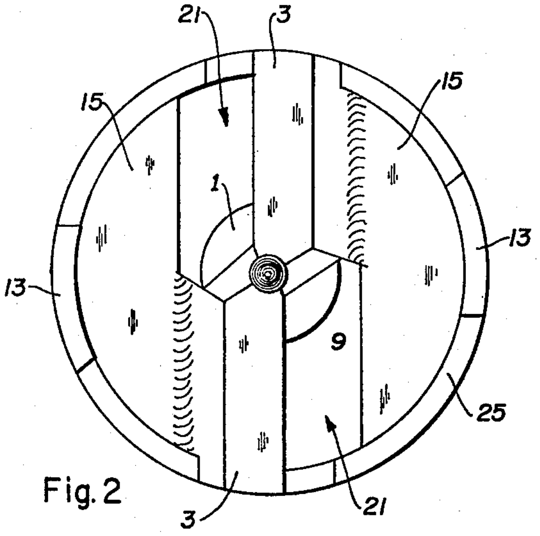
FIG. 2 is an underside view of the head of the bit of FIG. 1.
Figure 3:
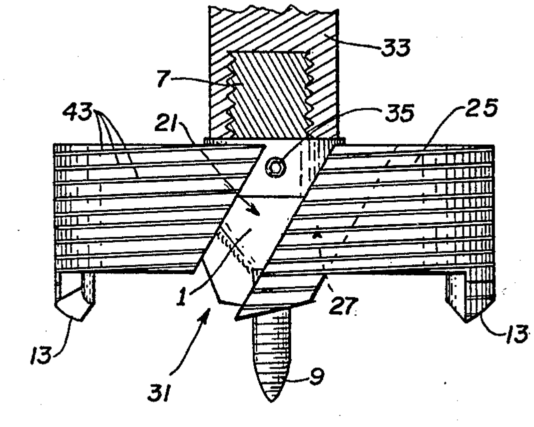
FIG. 3 is a view in elevation and partly in section of the bit of FIG. 1.
Figure 4:
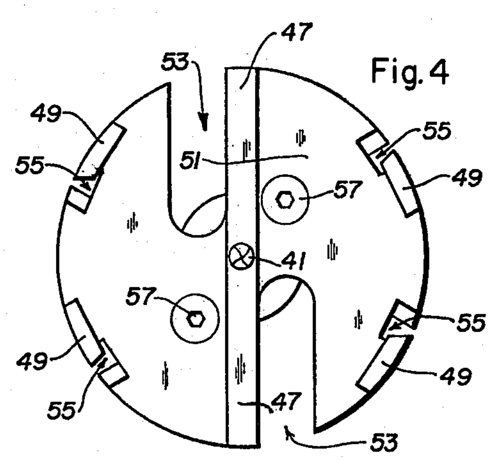
FIG. 4 is an underside view of an embodiment of the invention adapted primarily for high speed applications.
Figure 5:
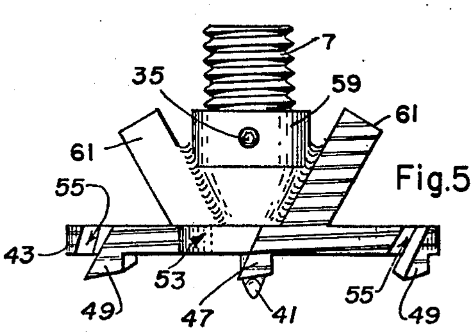
FIG. 5 is a view in elevation of the bit of FIG. 4.

Structurally, the bit includes a central hub 1 with radiating angular cutting blades 3, an end section 7 threaded for attachment to a shank and an axial opening to receive interchangeable pilots 9, together, these elements forming the basis of a cutter blade assembly. Spurs 13 with a sharpened leading edge and axially longer than the cutting blades, are supported by radius segments 15 laterally dependent from the blades to complete the blade assembly.

Such longer spurs precede the blades in a boring or drilling operation in the direction of arcuate travel of the ends of the blades to scribe a groove around the area to be removed, deeper than the blades are moving during the same turn. This depth cutting relationship between spurs and blades insures that material being shaved from inside the bore will not splinter or tear past the bore circumference and assures during normal use, a smooth splinter free inside surface.

Chip openings 21 through the assembly, flush with the cutting edge of the angular blades, allow chips and shavings cut by such blades to exit the bore to the opposite end of the assembly.

In one embodiment of the invention the spurs are an integral part of a circumambient skirt 25 attached to the radius segments. Such a skirt completely encircles the cutter assembly to provide full 360° axial stability during a drilling operation which is especially needed when cutting less than full holes or when boring holes at an angle.

In such an embodiment, a section is taken from the upper portion of the blade ends of a drill bit similar to that of my former patent to create a notch 27 for flushly receiving the skirt. The radius segments are preferably welded laterally from the blades and turned on a lathe to the inside diameter of the skirt, which is then welded to the segments and the notched blade ends.

An angular section is taken from the skirt in alignment with each of the chip openings to allow chip relief through such skirt. The angle of such opening has a slope such that the top overlaps the bottom to effectively provide, for supporting purposes, the equivalent of a complete outer surface. Such overlapping relationship insures the blade assembly to be completely supported at all points around its entire circumference while turning.

A drill assembly of the type under consideration is comprised of three readily removable and replaceable elements; e.g. a cutter blade assembly with a skirt as described above; a shank 33 with a threaded opening at one end for receiving the threaded end section 7 of the hub part; and a pilot means 9 secured in the axial opening on the blade side of the hub by a set screw 35, such pilot being used for guiding and/or feeding the assembly within the bore.

Such a pilot, as in my prior patent, may be threaded for drawing the bit into the bore at a constant rate dependent upon the pitch of the threads, or it may be a brad point 41 generally utilized for centering purposes, in the higher speed applications.

To assist a threaded type pilot, or act in lieu thereof, in maintaining feeding control of the drill bit assembly, threads 43 formed of a shallow spiral groove, preferably of fewer threads per inch than that of the pilot, may be applied to the outer cylindrical skirt surface to threadedly grip the completed bore portion. Because of such relationship, the threads on the skirt tend to advance the pilot in excess of its ability to advance, thus continually urging the pilot into advancing relationship with the wood. Without this relationship, the pilot is apt to strip the wood with which it is engaged. Such a drill bit including this thread relationship, becomes self feeding in response to rotation.

What is believed occurs, is the surface of the hole facing the grooves expands slightly into the grooves and is subsequently smoothed out by a wiping action of the cylindrical surface as the bit advances, leaving a smooth internal surface after the drilling operation.

Such threads on the skirt greatly reduce the friction generated against the internal bore surface, allow for relief of generated dust, reduce the power needed to drive the bit through work and substantially reduce the generated heat as compared to that of a similar bit without such threads in the skirt.

A second embodiment of the invention involves blades 47 and a plurality of spurs 49 being formed as a unit with the radius segments 51 to provide an integral module. This module, with chip openings 53 flush with the cutting blades, smaller chip openings 55 flush with and preceding the spurs 49 and a axial passage to accommodate a removable brad point pilot, may be secured with recessed socket head cap screws 57 to the hub to provide a four unit bit assembly.

The hub includes a central core 59 to which, at diametrically opposite locations, are welded angularly disposed wings 61 which terminate at their lower ends just behind the location of the cutter blades 47 in the final assembly. The assembly screws 57 anchor in these wings to provide a solid rugged assembly.

Such an embodiment is especially adaptable for higher speed applications as the blade and spur module, being the portion which takes the cutting load, may be made of high speed steel to the exclusion of the remainder of the assembly, allowing for economical manufacture and ready removal of the blade and spur module for sharpening or replacement.

Without the chip openings 55, applicant discovered that the bits, particularly at the higher operating speeds, had a tendancy to run hot. Upon investigation, it was found that chips produced by the spurs would not discharge adequately in as radially inward direction, into the space available, but would tend to accumulate between spurs and pack against the wall of the hole being drilled, and thus increase resistance with resultant elevation in temperature.

It can be seen, that while this embodiment is designed primarily for higher speed applications, it is readily adaptable to portable power simply by changing the brad point pilot to one of the threaded type.

While I have illustrated and described my invention in its preferred form, it will be apparent that the same is subject to alteration and modification without departing from the underlying principles involved and I therefore do not desire to be limited in my protection to the specific illustrated and described except as may be necessitated by the appended claims.

I claim:

1. A drill bit adapted to cut a circular hole in work comprising a central hub, radius segments extending laterally from said hub, each of said segments having a radial cutting blade and a plurality of peripheral spurs, each of said spurs having a channel adjacent thereto and extending completely through said radius segment to relieve residue from action of said spurs which cause friction and heat and oppose rotation of said drill bit.

2. A drill bit for cutting a circular hole in work comprising a central hub, a separate unitary blade and spur assembly including a plurality of blades each blade having a cutting edge, and associated with each blade a spur lying in a circular plane with the peripheral edge of said blade, said spur being located in advance of its associated cutting blade and apart therefrom so that there is a discontinuity of material between the spur and the peripheral edge of said blade, and means affixing said separate unitary blade and spur assembly to said central hub.

3. A drill bit in accordance with claim 2, characterized by means for facilitating removal from the regions of said spurs, chips created by said spurs, as such chips are created.

4. A drill bit in accordance with claim 2, characterized by said unitary blade and spur assembly including a pair of radius segments having arcuate peripheries, together defining substantially a circle, each of said radial segments having a radial cutting blade depending therefrom and extending from a point in proximity to the center of said hub to the periphery of the radial segment from which it depends, each of said radial segments having a chip relief opening adjacent to and extending substantially the length of the cutting blade associated with the other radial segment and a chip relief channel adjacent each spur and extending completely through the radial segment.

5. A drill bit in accordance with claim 4, characterized by said central hub including oppositely disposed wings having lower edges, each in contact with a radial segment just behind the location of a cutting blade, and means affixing said unitary blade and spur assembly to the lower ends of said wings.

* * * * *